United States Patent
Lindblom et al.

(10) Patent No.: US 12,555,237 B2
(45) Date of Patent: Feb. 17, 2026

(54) CLOSEUP IMAGE LINKING

(71) Applicant: Neko Health AB, Stockholm (SE)

(72) Inventors: Jonas Lindblom, Solna (SE); Mattias Kuldkepp, Sollentuna (SE); Pontus Persson, Enskede (SE)

(73) Assignee: Neko Health AB, Stockholm (SE)

( * ) Notice: Subject to any disclaimer, the term of this patent is extended or adjusted under 35 U.S.C. 154(b) by 0 days.

(21) Appl. No.: 18/876,143

(22) PCT Filed: Jun. 30, 2023

(86) PCT No.: PCT/EP2023/067949
§ 371 (c)(1),
(2) Date: Dec. 17, 2024

(87) PCT Pub. No.: WO2024/003328
PCT Pub. Date: Jan. 4, 2024

(65) Prior Publication Data
US 2025/0272841 A1    Aug. 28, 2025

(30) Foreign Application Priority Data
Jul. 1, 2022    (EP) .................................... 22182671

(51) Int. Cl.
*G06K 9/00*    (2022.01)
*G06T 7/00*    (2017.01)
(Continued)

(52) U.S. Cl.
CPC .......... *G06T 7/0016* (2013.01); *G06V 10/751* (2022.01); *G06V 10/764* (2022.01);
(Continued)

(58) Field of Classification Search
CPC ......... G06T 7/0016; G06T 2207/30088; G06T 2207/30096; G06V 10/751; G06V 10/764;
(Continued)

(56) References Cited

U.S. PATENT DOCUMENTS 11,185,278 B2 * 11/2021 Shachaf ................. A61B 5/444
2013/0053701 A1 * 2/2013 Wiest ................... A61B 5/0088
600/109

(Continued)

FOREIGN PATENT DOCUMENTS

WO    WO2016149626 A1    9/2016

OTHER PUBLICATIONS

HJN Sverige AB, International Search Report and Written Opinion, PCT/EP2023/067949, Sep. 4, 2023, 17 pgs.
(Continued)

*Primary Examiner* — Atiba O Fitzpatrick
(74) *Attorney, Agent, or Firm* — Morgan, Lewis & Bockius LLP

(57) ABSTRACT

The present disclosure relates to a method in a computer system (10) storing a model (1) of a body (B). The model comprises an overview image of a surface of skin of the body. The method comprises, in the overview image, identifying a lesion in the skin. The method also comprises assigning an ID to the identified lesion. The method also comprises communicating the ID to a mobile device (3). The method also comprises, at a data storage (2) of the computer system, receiving a closeup image of the lesion together with the communicated ID from the mobile device. The method also comprises, in said data storage, linking the received closeup image to the identified lesion in the overview image.

20 Claims, 3 Drawing Sheets

(51) Int. Cl.
*G06V 10/75* (2022.01)
*G06V 10/764* (2022.01)
*G06K 7/14* (2006.01)

(52) U.S. Cl.
CPC .. *G06K 7/1417* (2013.01); *G06T 2207/30088* (2013.01); *G06T 2207/30096* (2013.01); *G06V 2201/03* (2022.01)

(58) Field of Classification Search
CPC .............. G06V 2201/03; G06K 7/1417; A61B 5/441–447; A61B 5/0064
See application file for complete search history.

(56) References Cited

U.S. PATENT DOCUMENTS

| | | | |
|---|---|---|---|
| 2016/0048651 A1* | 2/2016 | Papier | G16H 30/20 382/128 |
| 2016/0275681 A1* | 9/2016 | D'Alessandro | G16H 30/40 |
| 2016/0314585 A1* | 10/2016 | Thomas | G06V 40/10 |
| 2021/0262861 A1* | 8/2021 | Kimpe | G06K 7/1417 |
| 2022/0061749 A1* | 3/2022 | Shachaf | H04N 23/673 |
| 2022/0133215 A1* | 5/2022 | Mayer | G16H 30/40 600/477 |

OTHER PUBLICATIONS

Anonymous, "VEOS Dermatoscope Reinvented" Veos HD2 | Canfield Scientific, Nov. 24, 2022, retrieved from: https://www.canfieldsci.com/imaging-systems/veos-hd1-hd2/, 15 pgs.
Anonymous, "VEOS on the App Store", Nov. 24, 2022, retrieved from: https://apps.apple.com/us/app/veos-hd1-hd2/id605626173, 4 pgs.
Neko Health AB, International Preliminary Report on Patentability, PCT/EP2023/067949, Sep. 16, 2024, 17 pgs.

* cited by examiner

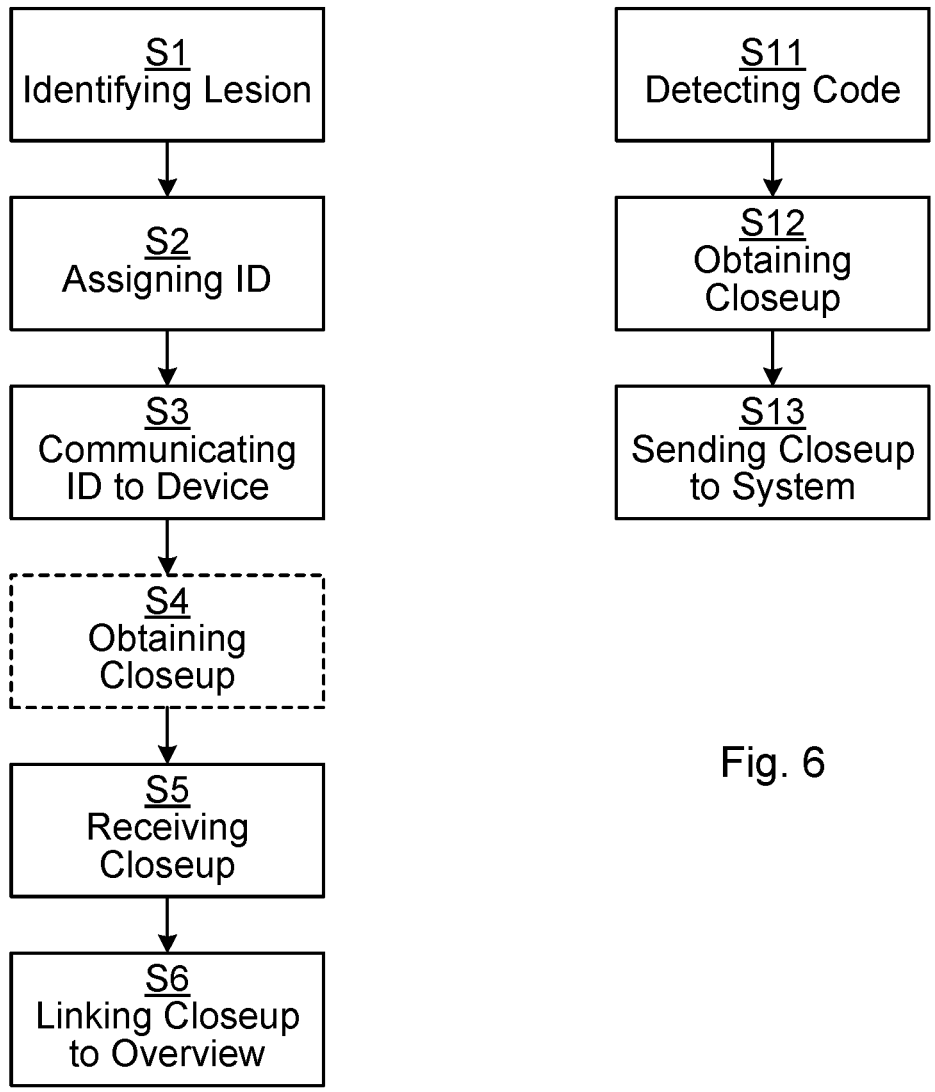

CLOSEUP IMAGE LINKING

CROSS REFERENCE TO RELATED APPLICATION

This Application is a United States National Stage Application filed under 35 U.S.C. § 371 of PCT Patent Application Serial No. PCT/EP2023/067949 filed on Jun. 30, 2023, which claims the benefit of and priority to European Patent Application No. 22182671.2 filed on Jul. 1, 2022, each of which is hereby incorporated by reference in its entirety.

TECHNICAL FIELD

The present disclosure relates to a computer system storing a model of a body, said model comprising an overview image of a surface of skin of the body.

BACKGROUND

There is a general desire to study skin lesions of a human or animal subject, e.g. to determine possible malignancy. Thus, images of different lesions and with different resolutions may be taken of the subject's skin. However, there is a problem of organizing all these images and keeping track of to which lesion each image relates, especially since lesions may change size and shape, and even disappear, over time. WO 2016/149626 discloses linking close-up dermoscopy images to features of a model of a body by tagging the feature with a mouse pointer. Features of the body are tagged in the model for capture by a handheld device working as a dermatoscope. A map of the features are sent from the system to the dermatoscope to facilitate the location of those features for which additional images are to be captured. The map can be displayed on the dermatoscope with features tagged for additional imaging being highlighted. As dermoscopic images are captured, the images can be readily linked to the respective features in the model. Thus, the dermatoscope is connected to the body model and when a feature of the model is highlighted, a close-up image taken by the dermatoscope is linked to the highlighted feature.

SUMMARY

It is an objective of the present invention to facilitate linking of a closeup image of a skin lesion to said lesion in an overall image.

According to an aspect of the present invention, there is provided a method performed in a computer system. The method is storing a model of a body. The model comprises an overview image of a surface of the skin of the body. The method comprises, in the overview image, identifying a lesion in the skin. The method also comprises assigning an identifier (ID) to the identified lesion. The method then comprises communicating the assigned ID to a mobile device. The method also comprises, at a data storage of the computer system, receiving a closeup image of the lesion together with the communicated ID from the mobile device, typically in response to the communicating of the ID to the mobile device. The closeup image has a higher resolution than the overview image, typically a higher spatial resolution, e.g. a higher number of pixels per mm imaged skin surface. The method then comprises, in said data storage, linking the received closeup image to the identified lesion in the wide-overview image.

According to another aspect of the present invention, there is provided a computer system comprising processing circuitry, and data storage storing a model of a body and storing instructions executable by said processing circuitry whereby said system is operative to perform an embodiment of a method of the present disclosure.

According to another aspect of the present invention, there is provided a computer program product comprising computer-executable components for causing a computer system to perform an embodiment of a method of the present disclosure when the computer-executable components are run on processing circuitry comprised in the system.

According to another aspect of the present invention, there is provided a method performed in a mobile device. The method comprises detecting a code from a computer system. The code comprises an ID of a lesion in skin of a body. The method also comprises, by a camera in the mobile device, obtaining a closeup image of the lesion. The method also comprises sending the obtained closeup image together with the received ID to the computer system.

According to another aspect of the present invention, there is provided a mobile device comprising processing circuitry, and storage storing instructions executable by said processing circuitry whereby said device is operative to perform an embodiment of a method of the present disclosure.

According to another aspect of the present invention, there is provided a computer program product comprising computer-executable components for causing a mobile device to perform an embodiment of a method of the present disclosure when the computer-executable components are run on processing circuitry comprised in the device.

By communicating the ID to the mobile device, said ID can be returned by the mobile device together with, e.g. in association with, the closeup image, whereby the computer system, specifically in a data storage of said computer system, can link the received closeup image of the lesion to the same lesion as identified in the overview image. The model may thus be updated with closeup images of lesions identified in the overview image, as desired, e.g. for closer study of the lesion. In some embodiments, the mobile device may be part of the computer system, e.g. if the mobile device is used by an operator of the computer system. In some other embodiments, the mobile device may be external to the computer system, e.g. if the mobile device is used by the subject who's body is being imaged. By means of the ID, contrary to the prior art, there is no need for the mobile device to be directly connected to the overview image. For instance, there is not need to highlight a lesion in the overview image when a closeup image is taken of that lesion in order to link the closeup image to the lesion in the overview image.

In some embodiments, the ID may be communicated to the mobile device directly from a terminal of the computer system, e.g. in a code presented to the mobile device. The code, when detected by the mobile device 3, may also enable the mobile device to communicate with or in the system 10, e.g. with the data storage 2. The code may e.g. comprise credentials for enabling/authorizing the mobile device 3 to send information including the closeup image to the storage 2. For instance, such a code could be presented by optic, acoustic, infrared (IR), Near-Field Communication (NFC), Bluetooth or Bluetooth Low Energy (BLE) means. In some preferred embodiments, the code may be an optic code, e.g. in the form of a QR code or barcode, typically QR, which may be presented on a screen of the computer system. Such an optical code may then be detected by the mobile device by scanning the presented code by means of a camera in the mobile device, e.g. a smartphone, possibly the same camera used for obtaining the closeup image. Such direct communication of the ID to the mobile device may be convenient e.g. if the mobile device is used by an operator of the computer system, e.g. in the vicinity of a terminal of the computer system which may already be logged into a service providing the model of the body. The code could also enable/authorize the mobile device to send the closeup image to the data storage.

Additionally or alternatively, in some embodiments, the ID may be sent via a backend connection, e.g. via a server or cloud of the computer system. The mobile device may e.g. be external of the computer system such as a smartphone of a user which may or may not be the subject who's body is imaged. The mobile device may then already be in communication with, or authorized to communicate with, the computer system, enabling the computer system to send the ID to the mobile device. for instance, a software application (app) running on the mobile device may be a client to the service running on the computer system and providing the model of the body, whereby the ID may be sent to said app in the mobile device. Additionally or alternatively, the ID may be sent to the mobile device via a web application of the service running on the computer system, which web application is accessed, e.g. logged into, by the mobile device by means of a web browser running on the mobile device.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5 is a schematic flow chart illustrating some embodiments of a method performed in a computer system, in accordance with the present invention.

FIG. 6 is a schematic flow chart of a method performed in a mobile device, in accordance with the present invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
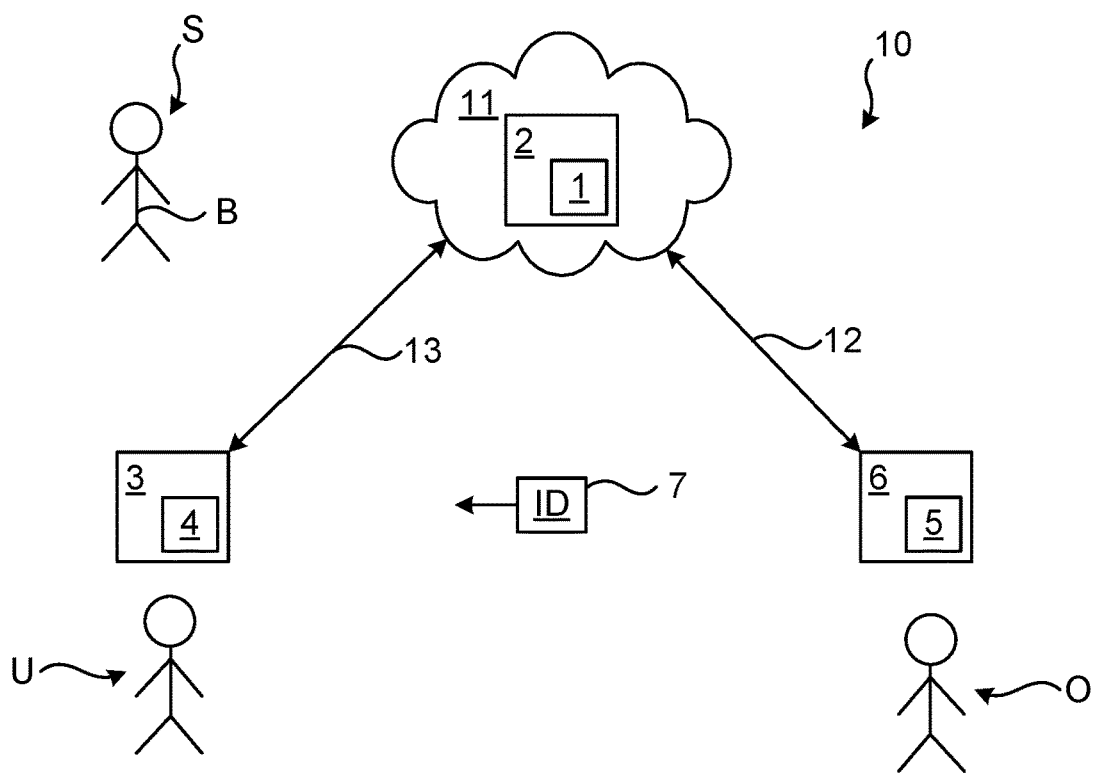
FIG. 1 is a schematic diagram illustrating some embodiments of a computer system in accordance with some embodiments of the present invention.

FIG. 1 illustrates a computer system 10 storing a model 1 of a body B. The model 1 may be stored in a data storage 2, e.g. a local or remote server or server system, or a cloud storage in a computing cloud 11 as exemplified in the figure. The model 1 may be stored in a database in the data storage 2. The body B may be of a human or animal subject S. The model 1 may be provided by a service, from a service provider, running on the computer system 10, e.g. the data storage 2 or processing circuitry associated therewith.

As mentioned herein, a mobile device 3 comprises a camera 4 and is used as a dermatoscope to obtain closeup image(s) of skin lesion(s) identified in the overview image of the model 1. The mobile device may be regarded as part of the computer system 10, or external to, but in communication with, the computer system 10. The mobile device 3 may be a handheld device which is held and operated by a human user U, which may e.g. be an operator O of the computer system 10 or a subject S who's body B is imaged in the model 1. Alternatively, the mobile device 3 may e.g. be held and moved by a robotic arm under automatic control or under control of the user U, e.g. the operator O. In some embodiments, the mobile device is a smartphone, e.g. provided with a detachable magnification lens attached to the camera 4 of the smartphone to enable obtaining of the closeup image by means of said smartphone camera 4. In other embodiments, the mobile device 3 is a purpose built dermatoscope. The mobile device 3 is able to send the closeup image to the data storage 2, to link the closeup image with the overview image in the model 1, by signalling 13, typically wireless signalling.

The computer system 10 may comprise a terminal 6, typically comprising a screen 5 for presenting information to an operator O of the terminal 6 and of the computer system 10. The terminal 6 is typically in communication with the storage 2 via wired or wireless communication 12, e.g. by means of an application software running on the terminal 6 and acting as a client to a service providing the model 1 and running on the computer system 10. For instance, the overview image of the model 1 may be presented to the operator O on the screen 5 of the terminal 6. Skin lesions in the overview image may be automatically identified by the computer system, and/or manually identified by the operator O via a user interface of the terminal 6. Similarly, respective identifiers (ID) of the identified lesion(s) may be automatically assigned by the computer system 10, and/or manually assigned by the operator O via a user interface of the terminal 6.

The ID assigned to a skin lesion is communicated to the mobile device 3, e.g. directly from the terminal 6 as illustrated in the figure, for instance comprised in a code 7 presented by the terminal 6 and detectable by the mobile device 3 as discussed herein, or directly from the terminal 6 by means of local wireless communication e.g. by Bluetooth, BLE, NFC or WiFi Direct. Alternatively, the ID assigned to a skin lesion may be communicated to the mobile device 3 via a central server or cloud 11 of the computer system 10 which is already able to communicate 13 with the mobile device 3.

Figure 2:
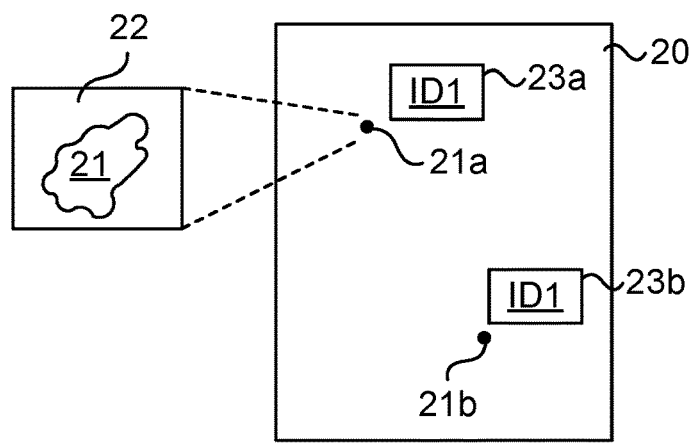
FIG. 2 is a schematic illustration of a closeup image linked to an overview image, in accordance with some embodiments of the present invention.

FIG. 2 illustrates an overview image 20 of the skin of the body B in the model 1. Lesions 21, here a first lesion 21a and a second lesion 21b, can be identified in the overview image 20, and a respective ID 23 is assigned to each of the identified lesions, whereby a first ID 23a is assigned to the first lesion 21a and a second ID 23b is assigned to the second lesion 21b. To enable more detailed study of an identified lesion 21, a closeup image 22 of the lesion 21 is obtained by means of the mobile device 3. The closeup image 22 has a higher resolution than the overview image 20, allowing the more detailed study of the lesion either automatically by the system 10 or manually by an operator O, e.g. viewing the closeup image 22 on the screen 5 of a terminal 6 of the system 10. For instance an operator O, e.g. a physician, may study the lesion in more detail in the closeup image 22, e.g. at a later time after optional automatic study by the system 10.

In some embodiments, a plurality of closeup images 22 may be obtained over time of the same lesion 21, allowing the system 10 or an operator O thereof to study any change of size or shape of the lesion 21 over time. Conveniently, each of said plurality of closeup images 22 may be linked to the lesion 21 in the data storage 2 together with a time stamp.

Figure 3:
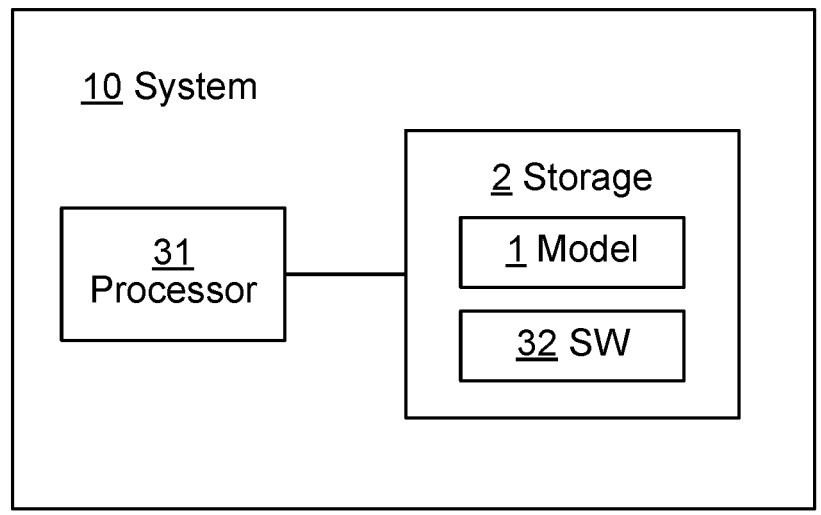
FIG. 3 is a schematic block diagram of a computer system in accordance with some embodiments of the present invention.

FIG. 3 illustrates an embodiment of the computer system 10. The system 10 comprises processing circuitry 31 e.g. a central processing unit (CPU). The processing circuitry 31 may comprise one or a plurality of processing units in the form of microprocessor(s). However, other suitable devices with computing capabilities could be comprised in the processing circuitry 31, e.g. a Graphics Processing Unit (GPU), an application specific integrated circuit (ASIC), a field programmable gate array (FPGA) or a complex programmable logic device (CPLD). The processing circuitry 31 is configured to run one or several computer program(s) or software (SW) 32 stored in the storage 2 of one or several storage unit(s) e.g. a memory. The storage 2 stores the model 1 discussed herein and may also store SW 32 for a service providing the model 1 when the service is run on processor circuitry 31 associated with the storage 2. A storage unit of the storage 2 is regarded as a computer readable means, forming a computer program product together with the SW 32 stored thereon as computer-executable components, and may e.g. be in the form of a Random Access Memory (RAM), a Flash memory or other solid state memory, or a hard disk, or be a combination thereof. The processing circuitry 31 may also be configured to store data in the storage 32, e.g. the closeup image(s) 22 received from the mobile device 3, as needed. The processing circuitry 31 may conveniently be comprised in a cloud 11 providing cloud computing.

Figure 4:
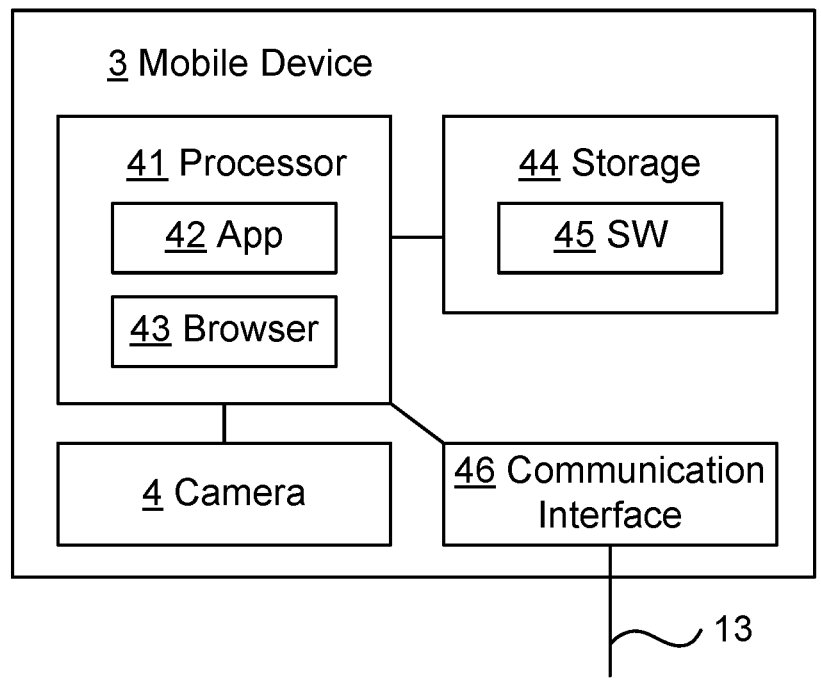
FIG. 4 is a schematic block diagram of a mobile device in accordance with some embodiments of the present invention.

FIG. 4 illustrates an embodiment of the mobile device 3, e.g. a smartphone. The device 3 comprises processing circuitry 41 e.g. a central processing unit (CPU). The processing circuitry 41 may comprise one or a plurality of processing units in the form of microprocessor(s). However, other suitable devices with computing capabilities could be comprised in the processing circuitry 41, e.g. an application specific integrated circuit (ASIC), a field programmable gate array (FPGA) or a complex programmable logic device (CPLD). The processing circuitry 41 is configured to run one or several computer program(s) or software (SW) 45 stored in a storage 44 of one or several storage unit(s) e.g. a memory. A storage unit of the storage 44 is regarded as a computer readable means, forming a computer program product together with the SW 45 stored thereon as computer-executable components, and may e.g. be in the form of a Random Access Memory (RAM), a Flash memory or other solid state memory, or a hard disk, or be a combination thereof. The processing circuitry 41 may also be configured to store data in the storage 44, as needed. The SW 45 may comprise software for an app 42 which is a client to the service providing the model 1 for communication 13 with the computer system 10, or the storage 2 therein, via a, preferably wireless, communication interface 46 in the mobile device 3. Additionally or alternatively, the SW 45 may comprise software for a web browser 43 for accessing a web application of the service providing the model 1 for communication 13 with the computer system 10, or the storage 2 therein, via the, preferably wireless, communication interface 46 in the mobile device 3. The mobile device also comprises the camera 4 for obtaining the closeup image 22 of the lesion(s) 21. As mentioned herein, the camera 4 may in some embodiments also be used for obtaining the ID 23 by scanning a code 7.

FIG. 5 is a flow chart illustrating a method performed in the computer system 10. The computer system 10 is storing a model 1 of the body B, e.g. in the data storage 2. The model 1 comprises an overview image 20 of a surface of skin of the body. The method comprises, in the overview image 20, identifying S1 a lesion 21 in the skin. The method also comprises, e.g. automatically or manually, assigning S2 an ID 23 to the identified S1 lesion 21. The method also comprises communicating S3 the ID 23 to the mobile device 3. The method also comprises, at a data storage 2 of the computer system 10, receiving S5 a closeup image 22 of the lesion 21 together with the communicated S3 ID 23 from the mobile device 3. By the mobile device 3 obtaining the closeup image in response to receiving the ID, and sending the closeup image together, and associated, with received ID, the system 10, at the storage 2 thereof, can determine which lesion the closeup image is depicting. The method also comprises, in said data storage 2, linking S6 the received S5 closeup image 22 to the identified S1 lesion 21 in the overview image 20. Thus, the closeup image can be stored in the storage 2, as part of the model 1, together with the overview image 20 and linked to the specific lesion 21.

In some embodiments of the present invention, in cases where the mobile device 3 is regarded as comprised in the system 10, the method may further comprise obtaining S4 the closeup image 22 of the lesion 21 by the mobile device 3, by means of the camera 4 thereof. The closeup image 22 may be obtained S4 in response to the mobile device receiving the ID when it is communicated S3 to the mobile device. The obtained S4 closeup image 22 is then sent to the data storage 2 of the system 10 where it is received S5.

Additionally or alternatively, in some embodiments of the present invention, the communicating S3 of the ID 23 comprises presenting a code 7 comprising the ID. The code is detectable by the mobile device 3. In some embodiments, the code 7 is an optical code, e.g. a QR code, presented on a screen 5 of the computer system 10, e.g. of a terminal 6.

Alternatively, in some other embodiments of the present invention, the communicating S3 of the ID 23 comprises sending the ID to an app 42 running on the mobile device 3, or via a web application to a web browser 43 running on the mobile device 3. This may be convenient if the mobile device 3 is already able/authorized to communicate with the storage 2, e.g. by being logged in to the service providing the model 1, e.g. via the app 42 or the web application.

In some embodiments, the data storage 2 is provided as cloud storage in a computer cloud 11.

FIG. 6 is a flow chart illustrating a method performed in the mobile device 3, specifically when a code 7 is used for communicating S3 the ID 23 to the mobile device 3. The method comprises detecting S11 the code 7 from the computer system 10, e.g. from the terminal 6 of the computer system 10. The detecting S11 may correspond to the communicating S3 of FIG. 5. The code comprises the ID 23 of a lesion 21 in skin of a body B. The method also comprises, by a camera 4 in the mobile device 3, obtaining S12 a closeup image 22 of the lesion 21. The method also comprises sending S13 the obtained S12 closeup image 22 together with the received S11 ID 23 to the computer system 10, e.g. to the storage 2 thereof. The sending S13 may thus correspond to the receiving S5 of FIG. 5.

In some embodiments, the code 7 is an optical code, e.g. a QR code. The code 7 may then be detected S11 by the mobile device 3 by means of a camera 4, e.g. the same camera 4 used for obtaining S12 the closeup image 22.

Additionally or alternatively, in some embodiments of the present invention, a detachable magnification lens attachment is attached to the camera 4 during the obtaining S12 of the closeup image 22. Such a lens attachment is commercially available for attachment to a regular smartphone which may then be used as a dermatoscope. The lens attachment may then be removed e.g. for allowing the camera 4 to detect an optical code 7. Thus, in some embodiments, the mobile device 3 is or comprises a smartphone, possibly in combination with a detachable lens attachment.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a computer system storing a model of a body, said model comprising an overview image of a surface of skin of the body, the method comprising:
   in the overview image, identifying a lesion, of a plurality of lesions, in the skin;
   assigning an identifier, ID, to the identified lesion;
   communicating the ID to a mobile device that is not directly connected to the overview image;
   at a data storage of the computer system, receiving a closeup image of a lesion together with the communicated ID from the mobile device, the closeup image having a higher resolution than the overview image;
   by the receiving of the closeup image together, and associated, with the ID, determining which lesion, of the plurality of lesions, the closeup image is depicting; and
   in said data storage, linking the received closeup image of the determined lesion to the same lesion as identified in the overview image.

2. The method of claim 1, further comprising, by a camera in the mobile device, obtaining the closeup image of the lesion before the receiving of the closeup image from the mobile device.

3. The method of claim 1, wherein the communicating of the ID comprises presenting a code comprising the ID, said code being detectable by the mobile device.

4. The method of claim 3, wherein the code is an optical code presented on a screen of the computer system.

5. The method of claim 1, wherein the communicating of the ID comprises sending the ID to a software application, app, running on the mobile device.

6. The method of claim 1, wherein the communicating of the ID comprises sending the ID via a web application to a web browser running on the mobile device.

7. The method of claim 1, wherein the data storage is provided as cloud storage.

8. A computer system storing a model of a body, said model comprising an overview image of a surface of skin of the body, the computer system comprising:
   processing circuitry; and
   data storage storing a model of a body and storing instructions executable by said processing circuitry whereby said system is operative to perform a set of operations, comprising:
   in the overview image, identifying a lesion, of a plurality of lesions, in the skin;
   assigning an identifier, ID, to the identified lesion;
   communicating the ID to a mobile device that is not directly connected to the overview image;
   at a data storage of the computer system, receiving a closeup image of a lesion together with the communicated ID from the mobile device, the closeup image having a higher resolution than the overview image;
   by the receiving of the closeup image together, and associated, with the ID, determining which lesion, of the plurality of lesions, the closeup image is depicting; and
   in said data storage, linking the received closeup image of the determined lesion to the same lesion as identified in the overview image.

9. A non-transitory computer readable storage medium comprising computer-executable components for causing a computer system, storing a model of a body, said model comprising an overview image of a surface of skin of the body, the computer system, to perform a set of operations when the computer-executable components are run on processing circuitry comprised in the computer system, the set of operations comprising:
   in the overview image, identifying a lesion, of a plurality of lesions, in the skin;
   assigning an identifier, ID, to the identified lesion;
   communicating the ID to a mobile device that is not directly connected to the overview image;
   at a data storage of the computer system, receiving a closeup image of a lesion together with the communicated ID from the mobile device (3), the closeup image having a higher resolution than the overview image;
   by the receiving of the closeup image together, and associated, with the ID, determining which lesion, of the plurality of lesions, the closeup image is depicting; and
   in said data storage, linking the received closeup image of the determined lesion to the same lesion as identified in the overview image.

10. The computer system of claim 8, wherein the set of operations further comprises, by a camera in the mobile device, obtaining the closeup image of the lesion before the receiving of the closeup image from the mobile device.

11. The computer system of claim 8, wherein the communicating of the ID comprises presenting a code comprising the ID, said code being detectable by the mobile device.

12. The computer system of claim 11, wherein the code is an optical code presented on a screen of the computer system.

13. The computer system of claim 8, wherein the communicating of the ID comprises sending the ID to a software application, app, running on the mobile device.

14. The computer system of claim 8, wherein the communicating of the ID comprises sending the ID via a web application to a web browser running on the mobile device.

15. The computer system of claim 8, wherein the data storage is provided as cloud storage.

16. The non-transitory computer readable storage medium of claim 9, wherein the set of operations further comprises, by a camera in the mobile device, obtaining the closeup image of the lesion before the receiving of the closeup image from the mobile device.

17. The non-transitory computer readable storage medium of claim 9, wherein the communicating of the ID comprises presenting a code comprising the ID, said code being detectable by the mobile device.

18. The non-transitory computer readable storage medium of claim 17, wherein the code is an optical code presented on a screen of the computer system.

19. The non-transitory computer readable storage medium of claim 9, wherein the communicating of the ID comprises sending the ID to a software application, app, running on the mobile device.

20. The non-transitory computer readable storage medium of claim 9, wherein the communicating of the ID comprises sending the ID via a web application to a web browser running on the mobile device.

* * * * *